(12) United States Patent
Lu

(10) Patent No.: US 8,234,882 B2
(45) Date of Patent: Aug. 7, 2012

(54) METHOD FOR PRODUCING IRIDESCENT CRYSTAL GLASS

(75) Inventor: Xiuqiang Lu, Suqian (CN)

(73) Assignee: Jiangsu Xiuqiang Glasswork Co., Ltd., Suqian, Jiangsu (CN)

( * ) Notice: Subject to any disclaimer, the term of this patent is extended or adjusted under 35 U.S.C. 154(b) by 263 days.

(21) Appl. No.: 12/557,857

(22) Filed: Sep. 11, 2009

(65) Prior Publication Data

US 2010/0064728 A1    Mar. 18, 2010

(30) Foreign Application Priority Data

Sep. 12, 2008   (CN) .......................... 2008 1 0195888

(51) Int. Cl.
*C03C 17/22*    (2006.01)
*C03C 17/28*    (2006.01)

(52) U.S. Cl. ............. 65/60.1; 65/174; 65/60.5; 65/60.4; 65/95; 65/90

(58) Field of Classification Search ........................ None
See application file for complete search history.

(56) References Cited

U.S. PATENT DOCUMENTS

| | | | |
|---|---|---|---|
| 5,669,951 A | | 9/1997 | Eichhorn |
| 6,279,350 B1 * | | 8/2001 | Vehmas ........................ 65/114 |
| 2004/0166316 A1 * | | 8/2004 | Noguchi ........................ 428/402 |
| 2008/0017076 A1 | | 1/2008 | Noguchi |

FOREIGN PATENT DOCUMENTS

| | | |
|---|---|---|
| CN | 1739981 A | 3/2006 |
| EP | 1 422 268 A2 | 5/2004 |

OTHER PUBLICATIONS

Nikumb et al., "Precision glass machining, drilling, and profile cutting by short pulse laser", Oct. 12, 2004, Thin solid Films 477 (2005) 216-221.*
Machine Translation of CN1739981.*
Machine Translation of CN1739981, Dialog, Sep. 20, 2011.*

* cited by examiner

*Primary Examiner* — Matthew Daniels
*Assistant Examiner* — Lisa Herring
(74) *Attorney, Agent, or Firm* — Christie, Parker & Hale, LLP

(57) ABSTRACT

The invention relates to a method for producing iridescent crystal glass. The glass products produced with the method of present invention have the advantages of good streamline shape, natural color transition, and excellent visual effect, etc.; the method is helpful for accelerating product upgrade, improving product appearance and visual effects, and enhancing competence of products. Therefore, we paint iridescent crystal ink on glass products, and add patterns suitable for household electric appliances and buildings, thereby greatly improving the appearance of the product. In addition, due to the high safety performance of toughened glass and suitability of patterns and colors, iridescent crystal glass products have been accepted by the consumers gradually. The method comprises the following steps: a. cutting; b. edge processing; c. toughening; d. ink preparation; e. iridescent crystal printing; f. drying: the drying time and drying temperature are controlled according to the properties of the mixed ink; the drying temperature is controlled at 120~200° C., and the drying time is controlled within 5~30 minutes.

4 Claims, No Drawings

METHOD FOR PRODUCING IRIDESCENT CRYSTAL GLASS

CROSS-REFERENCE TO RELATED APPLICATION

This application claims priority to and the benefit of Chinese Patent Application 200810195888.3, filed Sep. 12, 2008, in the State Intellectual Property Office of the People's Republic of China (SIPO), the entire content of which is incorporated herein by reference.

TECHNICAL FIELD

The present invention relates to a method for producing iridescent crystal glass, and belongs to the technical field of glass working.

BACKGROUND ART

The production of iridescent crystal glass was enlightened by the ancient screens of China. In ancient China, people drew or printed animals and plants, such as flowers, birds, insects, and fishes, on screens. As times changed, the dusting cold rolled sheets, PCM and VCM used for conventional refrigerator door shells and the ABS or PS plastic products for panels of air conditioners, lost marketing competence due to their tedious colors and patterns. Based on the deep processing of glass, the present inventive entity has been studying the effects of implementing the patterns and colors used on the screens by ancient Chinese on transparent glass. Therefore, the present inventive entity has painted iridescent crystal ink on glass, and added patterns suitable for household electric appliances and buildings in the later stage, thereby greatly improving the appearance of products. In addition, due to the high safety performance of toughened glass and the suitability of patterns and colors, iridescent crystal glass products have been gradually accepted by the consumers, and it is now time for iridescent crystal's development.

DISCLOSURE OF THE INVENTION

Technical problems: the object of the present invention is to provide a method for producing iridescent crystal glass. The glass produced by the method has the advantages of good streamline, natural color transition, and excellent visual effect.

Technical scheme: The method for producing iridescent crystal glass in the present invention comprises the following steps:

a. cutting: according to the technical requirements, the glass is cut on a computer-based cutting table. The parameters of the computer-based cutting table are set according to the actual size plus a tolerance of +0.25 millimeters and stored in the computer;

b. edge processing: according to the technical requirements, the edges of the products are processed on a linear edge grinding machine or double-edge grinding machine. The glass edges are processed with coarse grinding for chamfering, fine grinding for chamfering, fine grinding and polishing for chamfering, coarse grinding for edge rounding, and fine grinding for edge rounding; for the product processed with chamfering, the edges are usually processed to 0.3 mm×45°~1 mm×45°; for the product processed with edge rounding, the radius R of the round corner is not greater than the thickness of the glass; after corner processing, the semi-finished products are transferred to the washing step and prepared for toughening;

c. toughening: the glass is toughened in a toughening furnace according to the technical requirements. During the toughening treatment, the cooling wind pressure is 7 KPa-13 KPa; the heating time is 100-180 s/furnace; the cooling time is 20-50 s; the quenching time is 20-40 s; the flatness and granularity of the product should be guaranteed;

d. ink preparation: the ink preparation must be performed under the condition of indoor temperature at 23° C.±5° C. and humidity between 40%-70%. (1) dip the granular material into solvent or varnish and agitate gently; (2) mix the color ink with varnish and agitate gently; (3) mix the gently-agitated granular material with the agitated mixture of varnish and color ink, and then agitate again. For materials with silver powder, the agitation shall be carried out in a "slow-quick-slow" sequence (300 rpm-500 rpm-300 rpm) until well-mixed; for materials with pearl powder, crystal powder, or diamond powder, the agitation shall be carried out in a "slow-quick-slow" sequence (300 rpm-600 rpm-300 rpm) until well-mixed, and not agitated at high speed; (4) for materials with color pearl powder, the agitation speed shall be further lowered; (5) the agitated ink is filtered through a 120-180 mesh stainless steel screen, and part of the agitated ink is reserved for proofing; (6) after proofing, the bulk ink is distributed into small containers attached with appropriate labels for the use of production;

e. iridescent crystal printing: with toughened glass as base material, print logo, sight window and decorative patterns on the surface of glass in sequence and in predetermined colors, then confirm the color and add background color for product protection on the entire printing surface. Each printing must be followed with drying before entering the next procedure for printing;

f. drying: the drying time and drying temperature are controlled according to the properties of the mixed ink; the drying temperature is controlled at 120~200° C., and the drying time is controlled within 5~30 minutes.

The granular material comprises silver powder, pearl powder, crystal powder, diamond powder, the proportions of which during ink preparation are: silver powder $\leq 15\%$, pearl powder $\leq 25\%$, crystal powder $\leq 25\%$, and diamond powder $\leq 10\%$.

Beneficial effects: the glass products produced with the method in the present invention have the advantages of good streamline, natural color transition, and excellent visual effect, etc.; the method is helpful for accelerating product upgrade, improving product appearance and visual effects, and enhancing competitiveness of products. Therefore, the present inventive entity has painted iridescent crystal ink on glass products, and added patterns suitable for household electric appliances and buildings in a later period, thereby greatly improving the appearance of products. In addition, due to the high safety performance of toughened glass and suitability of the patterns and colors, iridescent crystal glass products have been gradually accepted by the consumers, and it is now time for their development.

DETAILED DESCRIPTION OF THE EMBODIMENTS (1) Cutting: a program is programmed in the computer according to the requirements of the drawings provided by the client (e.g., customer or end user); a piece of sheet glass is taken down from the glass rack with a sucker and laid flat on a cutting table; after the first piece of sheet glass is cut, each piece of cut glass has to be checked; if the size of any piece of cut glass goes beyond the tolerance range indicated on the drawings, the parameters just set in the computer should be adjusted to ensure the size of each piece of cut glass meets the requirements of the client;

(2) Edge processing: the edges of the products may be processed on a linear edge grinding machine or double-edge grinding machine. However, it must be according to the requirements of the client in the actual production process. For the present inventive products, the edge processing includes coarse grinding for chamfering, fine grinding for chamfering, fine grinding and polishing for chamfering, coarse grinding for edge rounding, and fine grinding for edge rounding, etc. For products processed with chamfering, the edges are usually processed to (0.3-1 mm)*45°; for products processed with edge rounding, the radius R of round corner is determined according to the thickness of glass, and is usually not greater than the thickness of glass; after edge processing, the glass is checked by random inspection to reduce or prevent any piece of glass with edges not conforming to the technical requirements of the drawings from entering the next procedure.

(3) Corner processing: the corners are polished according to the operation specification and according to the requirements on the drawings provided by the client, check products with R-gauge; after corner processing, the semi-finished products are transferred to the washing step and prepared for toughening;

(4) Toughening: set appropriate process parameters (taking 3.2 mm flat toughened glass in 3.2 mm thickness as referenced in this example, as shown in Table 1) according to the client's requirements. Carry out toughening treatment for the products. In the toughening procedure, the front and back surfaces of glass should be distinguished when it is laid; the heating temperature in the toughening furnace should be controlled according to the actual requirements; appropriate toughening equipment should be chosen according to the shapes of the products (e.g., glass products in arc shapes should be processed in equipment for arc-shaped glass); in addition, the glass products should be inspected after the toughening process;

TABLE 1

| | | | Process parameters for control of toughening surface (flat toughened glass in 3.2 mm thickness) | | | | | | File No. | XQ-QW-ID-03-186 |
|---|---|---|---|---|---|---|---|---|---|---|
| | | | | | | | | | Rev. | D |
| | | | | | | | | | commencement date | 2007-6-13 |

| | | | Temperature of upper part | | | | | | |
|---|---|---|---|---|---|---|---|---|---|
| | Area A1 | Area A2 | Area A3 | Area A4 | Area A5 | Area A6 | Other processes | | Remarks |
| 1 | 690° C.-750° C. | 690° C.-750° C. | 690° C.-750° C. | 690° C.-750° C. | 690° C.-750° C. | 690° C.-750° C. | Heating time | 90 s-120 s | |
| 2 | | 690° C.-750° C. | 690° C.-750° C. | 690° C.-750° C. | 690° C.-750° C. | | Quenching time | 10 s-20 s | |
| | | | | | | | Cooling time | 20 s-30 s | |
| 3 | 690° C.-750° C. | 690° C.-750° C. | 690° C.-750° C. | 690° C.-750° C. | 690° C.-750° C. | 690° C.-750° C. | Quenching wind pressure | 12500 Pa-14000 Pa | |
| 4 | | 690° C.-750° C. | 690° C.-750° C. | 690° C.-750° C. | 690° C.-750° C. | | Cooling wind pressure | 6000 Pa-6700 Pa | |
| 5 | 690° C.-750° C. | 690° C.-750° C. | 690° C.-750° C. | 690° C.-750° C. | 690° C.-750° C. | 690° C.-750° C. | Spacing of air grilles | 15 mm-25 mm | |
| 6 | | 690° C.-750° C. | 690° C.-750° C. | 690° C.-750° C. | 690° C.-750° C. | | | | |
| 7 | 690° C.-750° C. | 690° C.-750° C. | 690° C.-750° C. | 690° C.-750° C. | 690° C.-750° C. | 690° C.-750° C. | | | |
| 8 | | 690° C.-750° C. | 690° C.-750° C. | 690° C.-750° C. | 690° C.-750° C. | | | | |
| 9 | 690° C.-750° C. | 690° C.-750° C. | 690° C.-750° C. | 690° C.-750° C. | 690° C.-750° C. | 690° C.-750° C. | | | |
| 10 | | 690° C.-750° C. | 690° C.-750° C. | 690° C.-750° C. | 690° C.-750° C. | | | | |

| | Temperature of lower part | | | | | |
|---|---|---|---|---|---|---|
| | Area B1 | Area B2 | Area B3 | Area B4 | Area B5 | Area B6 |
| 1 | 680° C.-720° C. | 680°° C.-720° C. | 680°° C.-720° C. | 680° C.-720° C. | 680° C.-720° C. | 680° C.-720° C. |
| 2 | 680° C.-720° C. | 680° C.-720° C. | 680° C.-720° C. | 680° C.-720° C. | 680° C.-720° C. | 680° C.-720° C. |
| 3 | 680° C.-720° C. | 680° C.-720° C. | 680° C.-720° C. | 680° C.-720° C. | 680° C.-720° C. | 680° C.-720° C. |
| 4 | 680° C.-720° C. | 680° C.-720° C. | 680° C.-720° C. | 680° C.-720° C. | 680° C.-720° C. | 680° C.-720° C. |
| 5 | 680° C.-720° C. | 680° C.-720° C. | 680° C.-720° C. | 680° C.-720° C. | 680° C.-720° C. | 680° C.-720° C. |
| 6 | 680° C.-720° C. | 680° C.-720° C. | 680° C.-720° C. | 680° C.-720° C. | 680° C.-720° C. | 680° C.-720° C. |

Prepared by:        Signed by:        Reviewed by:        Approved by:

(5) Iridescent crystal printing: with toughened glass as base material (the printing surface of the glass should be cleaned before printing to ensure no dirt on the printing surface); print logo, sight window, and decorative patterns, etc., on the surface of the glass,—confirm the color on the entire surface-add background color for protection. Each of the printing processes must be followed with drying through the drying line before entering the next procedure for printing; in addition, after each process of printing, the printers and furnace-port workers must carry out a self-check to ensure a high percentage of passage of the products.

(6) Drying: after each process of printing, the iridescent crystal glass products are put into an infrared drying furnace for drying, the drying time being determined according to the properties of the material; the drying parameters and drying time shall not be changed freely (taking the drying process for LG white wire-drawing products as reference, as shown in Table 2). Of course, some of the present inventive products adopted UV ink. Similarly, the curing time of the production adopting UV ink must also be strictly controlled during operation, for example, the wattage of the UV lamp, the number of UV lamps used in each drying line, and the length of drying line must be controlled according to the technical specification.

The above points are key points in production of iridescent crystal glass. Each of the following processes, purchase of sheet glass-inspection-cutting-inspection-edge grinding-inspection-corner processing-inspection-toughening-inspection-drying-inspection-packaging-warehousing, can be processed in the normal environment.

For iridescent crystal printing, control should or must be executed in the following steps due to the particular procedures:

(1) Purchase and inspection of raw and auxiliary materials (sheet glass, ink, film, etc.)

The products of the present invention have high requirements for raw and auxiliary materials.

(2) Adjustment and control of environment, linear speed of drying line, drying temperature (wattage and quantity of UV lamps), printing speed, and mix ratio of ink, etc. The environment, linear speed of drying line, drying temperature, printing speed, and mix ratio of printing ink should or must be controlled strictly.

(3) Tracking and inspection of product appearance, acid and alkali test, adhesion, flatness, shock strength, and boiling water resistance, etc.

TABLE 2

Process sheet (Ink formula☐ Production process☐ Key process☐)

Development department                                                                 Jul. 2, 2007 No.: 20070702001-G
                                                                                        Date of
Client        Product model No.           Product name                                 commencement         Target department Taizhou LG    Q23                          Refrigerator panel                          2007.7.2             Experiment          1 copy
White wire-drawing printing process for product Q23 of Taizhou LG (SILK SCREEN)                             Center
              Tension         Screen      Wire                                                              Printing            Copies
              force of        Screen      diameter    Hardness    Screen    Drying        Drying            department
              screen plate    mesh        of screen   of scraper  spacing   temperature   time              Iridescent          1 copy
Wire-         12.5~14.5N      200#        DPP         85A         8-10 mm   130~140° C.   15 minutes        crystal
drawing       A pass of printing, a pass of scraping                                                        department
Finish        12.5~14.5N      100#        DPP         85A         8-10 mm   130~140° C.   15 minutes        Department 1        Copies
paint         A pass of printing, a pass of scraping                                                        Department 2        Copies
Flower        12.5~14.5N      100#        DPP         85A         8-10 mm   130~140° C.   15 minutes        Department 3        Copies
stalk color   A pass of printing, a pass of scraping                                                        Department 4        Copies
Back          12.5~14.5N      100#        DPP         85A         8-10 mm   130~140° C.   20 minutes
cover         A pass of printing, two passes of scraping
Position      12.5-14.5N      150#        DPP         85A         8-10 mm   130~140° C.   15 minutes
line          A pass of printing, a pass of scraping 1. Requirements for ink preparation: see "Operating Rules for Low Temperature Ink Preparation Room"
2. Requirements for printing environment: See "Instruction on Use of Fuji, Zhongyi, and Carpoly ink" (issued on Aug. 26, 2006);
3. All drying times and temperatures shown above are actual drying temperatures and times.
Prepared by:      Reviewed                                  Approved
                  by:                                       by:
Date:             Date:                                     Date:

(7) Inspection: the production line inspectors inspect the finished products and overlay protective films on them.

(8) Packaging and warehousing: the qualified products are packed and each package is fastened with pack belt in the form of "+" to ensure product safety during transport, and then the products are warehoused for shipment. The inspectors in the quality control department carry out shipment inspection of the products in the warehouse to ensure high product quality without clients' feedback of quality problems.

The environment should or must be a dust-free printing space at room temperature (20-25° C., humidity controlled within 40-60%) and the drying time and temperature must be controlled; the key control point of product adhesion is to control the relation between the linear speed and temperature (wattage and quantity of UV lamps) of the drying line; the key control point of product color is to control the mix ratio of ink (taking the material formula of LG white wire-drawing products as reference, as shown in Table 3) and keep a stable drying temperature.

TABLE 3

Mix ratio of ink for white wire-drawing printing
for product Q23 of Taizhou LG (SILK SCREEN)

| | Manufacturer | Material | Name | Batch | Quantity (g) |
|---|---|---|---|---|---|
| First pass: wire-drawing | Fuji Chemical Research Institute | MET-SH | Varnish 00 | | 55 |
| | Jiangsu Belide | P123 | Silvery white P123 | | 6 |
| | Fuji Chemical Research Institute | MET-SH | White 07 | 1705281 | 1 |
| | Fuji Chemical Research Institute | MET-SH | Retardant | | 4 |
| Second pass: finish paint | Fuji Chemical Research Institute | MET-SH | Varnish 00 | | 700 |
| | Jiangsu Belide | P151 | Silvery white P151 | | 130 |
| | Wenzhou Kuncai | KC403 | Peach-red KC403 | | 4 |
| | Fuji Chemical Research Institute | MET-SH | White 07 | 1705281 | 50 |
| | Fuji Chemical Research Institute | MET-SH | Ultramarine 85 | 1609111 | 0.5 |
| | Fuji Chemical Research Institute | MET-SH | Retardant | | 100 |
| Third pass: flower stalk color | Fuji Chemical Research Institute | MET-SH | Varnish 00 | | 678 |
| | Wenzhou Kuncai | KC407 | KC407 | | 2.1 |
| | Jiangsu Belide | P151 | Silvery white P151 | | 150 |
| | Fuji Chemical Research Institute | MET-SH | Red 17 | 1605241 | 3.5 |
| | Fuji Chemical Research Institute | MET-SH | Black 90 | 1706251 | 5 |
| | Fuji Chemical Research Institute | MET-SH | Retardant | | 220 |
| Back cover | Ordinary Fuji white ink for back cover | | | | Ordinary Fuji white ink for back cover |
| Position line | Fuji Chemical Research Institute | MET-SH | Varnish 00 | | 1780 |
| | Jiangsu Belide | P151 | Silvery white P151 | | 145 |
| | Wenzhou Kuncai | KC403 | Peach-red KC403 | | 5.8 |
| | Fuji Chemical Research Institute | MET-SH | White 07 | 1705281 | 60 |
| | Fuji Chemical Research Institute | MET-SH | Ultramarine 85 | 1609111 | 0.7 |
| | Fuji Chemical Research Institute | MET-SH | Retardant | | 248 |

(4) Today, iridescent crystal glass products are mainly applied on refrigerators, air conditioners, freezers, washing machines, microwave ovens, and household supplies as decoration, which not only improve the appearance and visual effect but also enhance structural safety of the products. It will find wide application.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

The invention claimed is:

1. A method for producing iridescent crystal glass, the method comprising:

a. cutting: a glass is cut on a computer-based cutting table according to the technical requirements to produce a glass product; the parameters of the computer-based cutting table are set according to the actual size plus a tolerance of +0.25 millimeters and stored in the computer;

b. edge and corner processing: according to the technical requirements, glass edges of the product are processed on a linear edge grinding machine or a double-edge grinding machine; the glass edges are processed with coarse grinding for chamfering, fine grinding for chamfering, fine grinding and polishing for chamfering, coarse grinding for edge rounding, and fine grinding for edge rounding; for the product processed with chamfering, the glass edges are usually processed to 0.3 mm×45°~1 mm×45'; for the products processed with edge rounding, the radius R of a round corner is not greater than the thickness of the glass; after corner processing, the semi-finished products are transferred to a washing step and prepared for toughening;

c. toughening: in accordance with the technical requirement, the glass is toughened in a toughening furnace; during the toughening treatment, the cooling wind pressure is 7 KPa-13 KPa; the heating time is 100-180 s/furnace; the cooling time is 20-50 s; the quenching time is 20-40 s; the flatness and granularity of the products should be guaranteed;

d. preparing of ink: ink preparation must be performed in the condition of indoor temperature at 23° C.±5° C. and humidity between 40%-70%; (1) dip a granular material into solvent or varnish and agitate gently; (2) mix a color ink with varnish and agitate gently; (3) mix the gently-agitated granular material with the agitated mixture of varnish and the color ink, and then agitate again; for materials with silver powder, the agitation shall be carried out in a "slow-quick-slow" sequence; for materials with pearl powder, crystal powder, or diamond powder, the agitation shall be carried out in a "slow-quick-slow" sequence, and not agitated at high speed; (4) for materials with color pearl powder, the agitation speed shall be further lowered; (5) the agitated ink is filtered through a 120-180 mesh stainless steel screen, and part of the agitated ink is reserved for proofing; (6) after proofing, the remaining bulk agitated ink is distributed into small containers attached with appropriate labels for the use of production;

e. iridescent crystal printing: with toughened glass as base material, print logo, sight window, and decorative patterns with the prepared ink on the surface of the glass in sequence and in predetermined colors, then, confirm the color and add background color for product protection on the entire printing surface; each printing must be followed with drying before entering the next procedure for printing; and f. drying: the drying time and drying temperature are controlled according to the properties of the prepared ink; the drying temperature is controlled at 120~200° C., and the drying time is controlled within 5~30 minutes.

2. The method for producing iridescent crystal glass according to claim 1, wherein, the granular material comprises silver powder, pearl powder, crystal powder or diamond powder, the weight proportions of which in the prepared ink are: silver powder $\leq 15\%$, pearl powder $\leq 25\%$, crystal powder $\leq 25\%$, and diamond powder $\leq 10\%$.

3. A method for producing iridescent crystal glass, the method comprising:

a. cutting a glass material to produce a glass product, wherein the glass material is cut on a computer-based cutting table comprising a computer, and wherein cutting parameters of the computer-based cutting table are set according to the actual size plus a tolerance of +0.25 millimeters and stored in the computer;

b. edge and corner processing the product, wherein glass edges of the glass product are processed on a linear edge grinding machine or a double-edge grinding machine, wherein the glass edges are processed with coarse grinding for chamfering, fine grinding for chamfering, fine grinding and polishing for chamfering, coarse grinding for edge rounding, and fine grinding for edge rounding, wherein:

for the glass product processed with chamfering, the glass edges are usually processed to 0.3 mm×45°~1 mm×45°, for the glass product processed with edge rounding, the radius R of round corner is not greater than the thickness of the glass material, and after corner processing, the semi-finished glass product is transferred to a washing process and prepared for toughening;

c. toughening the glass product with a toughening treatment, wherein the glass product is toughened in a toughening furnace, wherein:

during the toughening treatment, the cooling wind pressure is 7 KPa-13 KPa, the heating time is 100-180 s/furnace, the cooling time is 20-50 s, the quenching time is 20-40 s, and the flatness and granularity of the glass product is controlled;

d. preparing a bulk ink, wherein the preparing of the bulk ink is performed in the condition of indoor temperature at 23° C.±5° C. and humidity between 40%-70%, and wherein the preparing of the bulk ink is further performed by (1) dipping granular material into solvent or varnish and agitating gently; (2) mixing color ink with varnish and agitating gently; (3) mixing the gently-agitated granular material with the agitated mixture of the solvent or varnish and the color ink, and then agitating again, wherein:

for materials with silver powder, the agitation is carried out in a "slow-quick-slow" sequence, for materials with pearl powder, crystal powder, or diamond powder, the agitation is carried out in a "slow-quick-slow" sequence, and not agitated at high speed, and for materials with color pearl powder, the agitation speed shall be further lowered, wherein the agitated ink is filtered through a 120-180 mesh stainless steel screen, and part of the agitated ink is reserved for proofing, and wherein after proofing, the bulk ink is distributed into small containers attached with appropriate labels for the use of production;

e. iridescent crystal printing, wherein with the toughened glass product as base material, the iridescent crystal printing includes printing logo, sight window and decorative patterns with the prepared ink on the surface of the glass product in sequence and in predetermined colors, then, confirming the color and adding background color for product protection on the entire printing surface, and wherein each printing is followed with drying before entering the next procedure for printing; and f. drying the glass product, wherein drying time and drying temperature are controlled according to the properties of the prepared ink, wherein the drying temperature is controlled at 120~200° C., and wherein the drying time is controlled within 5~30 minutes.

4. The method for producing iridescent crystal glass according to claim 3, wherein, the granular material comprises silver powder, pearl powder, crystal powder or diamond powder, the weight proportions of which in the prepared ink are: silver powder $\leq 15\%$, pearl powder $\leq 25\%$, crystal powder $\leq 25\%$, and diamond powder $\leq 10\%$.

* * * * *